(12) United States Patent
Pekovic et al.

(10) Patent No.: US 11,703,421 B2
(45) Date of Patent: Jul. 18, 2023

(54) SYSTEM AND METHOD FOR VALIDATING COMPONENT INTEGRITY IN AN ENGINE

(71) Applicant: PRATT & WHITNEY CANADA CORP., Longueuil (CA)

(72) Inventors: Tatjana Pekovic, St-Lambert (CA); Sean McCarthy, Beaconsfield (CA); Andrew Ghattas, La Prairie (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 327 days.

(21) Appl. No.: 16/263,327

(22) Filed: Jan. 31, 2019

(65) Prior Publication Data

US 2020/0249125 A1 Aug. 6, 2020

(51) Int. Cl.
G01M 15/14 (2006.01)
G06F 16/16 (2019.01)
F01D 17/02 (2006.01)
F01D 21/00 (2006.01)

(52) U.S. Cl.
CPC ............ *G01M 15/14* (2013.01); *F01D 17/02* (2013.01); *F01D 21/003* (2013.01); *G06F 16/164* (2019.01)

(58) Field of Classification Search
CPC ...... G01M 15/14; G06F 16/164; F01D 17/02; F01D 21/003; G05B 23/0256
See application file for complete search history.

(56) References Cited

U.S. PATENT DOCUMENTS

| | | | |
|---|---|---|---|
| 4,135,246 A | 1/1979 | McMannis | |
| 4,303,850 A | 12/1981 | Juhasz et al. | |
| 5,042,295 A | 8/1991 | Seeley | |
| 6,138,081 A * | 10/2000 | Olejack | G01M 15/00 702/182 |
| 6,408,258 B1 | 6/2002 | Richer | |
| 7,031,812 B1 | 4/2006 | Pettigrew et al. | |
| 7,143,007 B2 * | 11/2006 | Long | G05B 19/4065 702/184 |
| 7,148,814 B2 * | 12/2006 | Sikora | G01D 7/08 700/12 |

(Continued)

FOREIGN PATENT DOCUMENTS

CA 2604118 C 6/2010
WO 2018044507 A1 3/2018

OTHER PUBLICATIONS

European Search Report of Application No. 20154987.0 dated Jun. 22, 2020.

(Continued)

*Primary Examiner* — Freddie Kirkland, III
(74) *Attorney, Agent, or Firm* — Norton Rose Fulbright Canada LLP (57) ABSTRACT

Methods and systems for validating component integrity in an engine are described. First usage data associated with a period of operation of the engine is obtained at an engine controller. An indication of the first usage data is transmitted from the engine controller to a first presentation device. Second usage data associated with the period of operation of the engine is received at the engine controller from an input device. The first usage data is compared to the second usage data at the engine controller. Based on the comparing, an alert is issued to a second presentation device independent from the first presentation device.

20 Claims, 4 Drawing Sheets

(56) References Cited

U.S. PATENT DOCUMENTS

| | | |
|---|---|---|
| 7,149,657 B2 | 12/2006 | Goebel et al. |
| 7,197,430 B2 | 3/2007 | Jacques et al. |
| 7,243,042 B2 | 7/2007 | Plotts et al. |
| 7,548,830 B2 | 6/2009 | Goebel et al. |
| 7,725,293 B2 | 5/2010 | Bonissone et al. |
| 7,824,147 B2 | 11/2010 | Morris et al. |
| 8,116,990 B2 * | 2/2012 | Koul .................. G05B 23/0245 702/34 |
| 8,131,420 B2 | 3/2012 | Lynch et al. |
| 8,200,442 B2 | 6/2012 | Adams et al. |
| 8,442,778 B2 * | 5/2013 | Bechhoefer ............. F03D 7/047 290/44 |
| 8,571,814 B2 | 10/2013 | Zhao et al. |
| 8,667,332 B2 | 3/2014 | Bharadwaj et al. |
| 8,688,320 B2 * | 4/2014 | Faenger ................. B60K 35/00 340/500 |
| 8,903,570 B2 | 12/2014 | Bailly et al. |
| 8,918,264 B2 | 12/2014 | Jegu et al. |
| 8,930,120 B2 * | 1/2015 | Kwon .................. G01M 15/12 340/963 |
| 9,494,490 B2 * | 11/2016 | Tralshawala .......... G01M 15/14 |
| 9,563,989 B2 | 2/2017 | Gaulard et al. |
| 9,569,397 B2 * | 2/2017 | Higgins ................ G06Q 10/20 |
| 9,701,420 B1 * | 7/2017 | Tucker .................. G07C 5/008 |
| 9,791,352 B2 * | 10/2017 | Patrick .............. G05B 23/0283 |
| 9,885,636 B2 | 2/2018 | Balandier |
| 9,963,244 B2 | 5/2018 | Tucker |
| 10,002,112 B2 * | 6/2018 | Hamblin ................ G07C 5/008 |
| 10,025,893 B2 | 7/2018 | Andersson et al. |
| 10,318,664 B2 | 6/2019 | Andersson et al. |
| 10,825,468 B2 * | 11/2020 | Henderson ........... G09B 29/007 |
| 10,852,718 B2 * | 12/2020 | Unuma ..................... G07C 5/02 |
| 2003/0176954 A1 | 9/2003 | Jaw |
| 2005/0143956 A1 * | 6/2005 | Long .................. F04D 15/0088 702/184 |
| 2006/0220914 A1 * | 10/2006 | Sikora ...................... G01D 7/08 340/945 |
| 2012/0283963 A1 * | 11/2012 | Mitchell ............ G05B 23/0283 702/34 |
| 2014/0039806 A1 | 2/2014 | Liao et al. |
| 2015/0227658 A1 * | 8/2015 | Persson .................. G06F 17/10 703/2 |
| 2015/0293584 A1 | 10/2015 | Bernstein |
| 2015/0338312 A1 * | 11/2015 | Ovando, II ........ G05B 23/0272 702/34 |
| 2017/0357618 A1 * | 12/2017 | Hamblin ................ G07C 5/085 |
| 2017/0372723 A1 | 12/2017 | Henderson |
| 2018/0080853 A1 | 3/2018 | Yuan et al. |
| 2018/0162549 A1 | 6/2018 | Ziarno |
| 2018/0329904 A1 | 11/2018 | Gupta et al. |

OTHER PUBLICATIONS

European Patent Office, Communication pursuant to Article 94(3) EPC re. European patent application No. 20154987.0, dated Apr. 8, 2022.

\* cited by examiner

SYSTEM AND METHOD FOR VALIDATING COMPONENT INTEGRITY IN AN ENGINE

TECHNICAL FIELD

The application relates generally to engine safety, and more particularly to validating component integrity in an engine.

BACKGROUND OF THE ART

Rotating components in gas turbine engines experience various forms of fatigue, including so-called "low cycle fatigue" and "creep damage". Component fatigue can occur as a result of operation at high temperatures, of repeated plastic deformation of components during use, and the like. Fatigued components can eventually break or otherwise fail, and aircraft components can be subjected to regulations requiring preventative maintenance or replacement of components to avoid fatigue-related failure.

Existing approaches for monitoring component fatigue require sophisticated hardware, which may not be available on certain aircraft. Operators instead rely on simple counting statistics, such as flight time or distance, which can overestimate the wear on components and lead to early replacement or maintenance.

As such, there is room for improvement.

SUMMARY

In accordance with a broad aspect, there is provided herein a method for validating component integrity in an engine. First usage data associated with a period of operation of the engine is obtained at an engine controller. An indication of the first usage data is transmitted from the engine controller to a first presentation device. Second usage data associated with the period of operation of the engine is received at the engine controller from an input device. The first usage data to is compared the second usage data at the engine controller. Based on the comparing, an alert is issued to a second presentation device independent from the first presentation device.

In accordance with another broad aspect, there is provided a system for validating component integrity in an engine. The system comprises a processing unit and a non-transitory computer-readable medium coupled to the processing unit. The computer-readable medium has stored thereon instructions executable by the processing unit for: obtaining, at an engine controller, first usage data associated with a period of operation of the engine; transmitting, from the engine controller to a presentation device, an indication of the first usage data; receiving, at the engine controller, second usage data associated with the period of operation of the engine, the second usage data received from an input device; comparing, at the engine controller, the first usage data to the second usage data; and based on the comparing, issuing an alert to a second presentation device independent from the first presentation device.

DESCRIPTION OF THE DRAWINGS

Reference is now made to the accompanying figures in which.

DETAILED DESCRIPTION

Components in aircraft, for example in aircraft engines, are subject to a variety of regulatory standards. One group of regulatory standards relates to component integrity: regulations may require that a particular component of an aircraft or aircraft engine be replaced after a predetermined period of time, after the component has been subjected to a predetermined number of rotations, cycles, flight miles, or the like. Modern aircraft engines incorporate electronic engine control systems (EECS) which are equipped with a variety of sensors, allowing for automatic measurement of fatigue cycle counts for components of the engine, and which can report usage data relating to the components.

In addition, communication systems in aircraft can be subject to regulations which assign a "trust level" to each component in a communication network (e.g., a Functional Development Assurance Level, or FDAL). In order to communicate critical information (e.g., which can be indicative of catastrophic failure, severe failure, or other hazardous conditions), components with a high trust level are required. Less critical information (e.g., which can be indicative of major or minor failure, or without any safety effect) can be communicated using components with lower trust levels. One example of these regulations can be found in the Society of Automotive Engineers (SAE) Aerospace Recommended Practice (ARP) 4754A.

Aircraft engines are typically provided with EECS having a sufficiently-high trust level for electronically reporting usage data. However, smaller and less sophisticated aircraft can lack the requisite equipment for providing operators with the usage data measured by the EECS: the communication systems used to relay the usage data measured by the EECS to an operator can be of a too-low trust level, and thus do not respect established regulatory standards. The present disclosure relates to methods and systems for validating the integrity of components of an aircraft, including of aircraft engines, which respect established regulatory standards despite at least some of the usage data reporting equipment not having a suitably high trust level.

Figure 1:
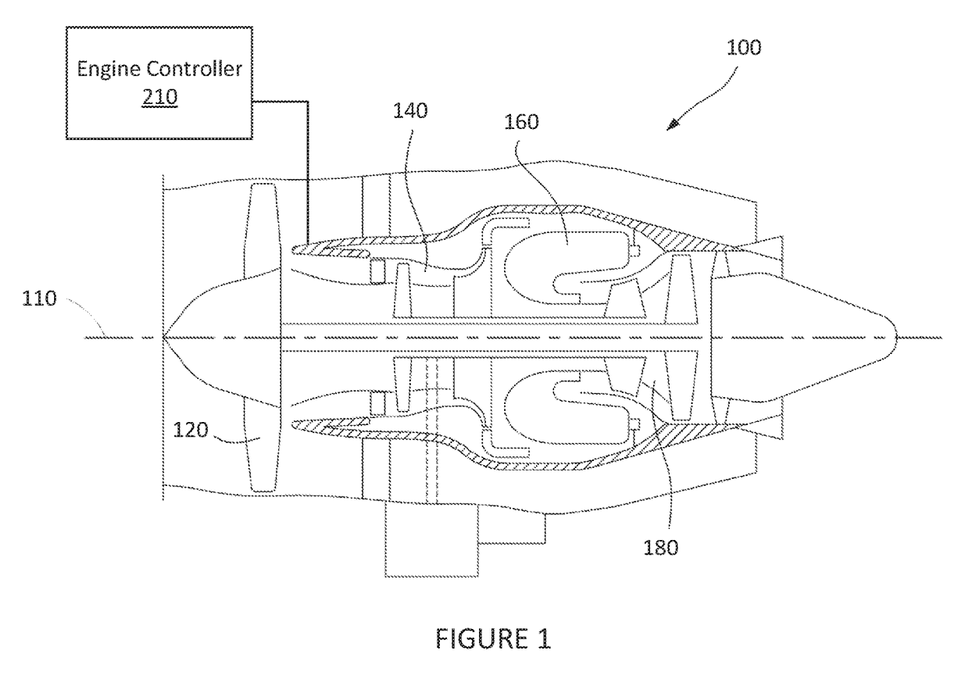
FIG. 1 is a cutaway side elevational view of an example engine, in accordance with one or more illustrative embodiments.

With reference to FIG. 1, there is illustrated a gas turbine engine 100 to which the validating methods and systems may be applied. Note that while engine 100 is a turbofan engine, the detection methods and systems may be applicable to turboprop, turboshaft, and other types of gas turbine engines. In addition, the engine 100 may be an auxiliary power unit (APU), an auxiliary power supply (APS), a hybrid engine, or any other suitable type of engine.

Engine 100 generally comprises in serial flow communication: a fan 120 through which ambient air is propelled, a compressor section 140 for pressurizing the air, a combustor 160 in which the compressed air is mixed with fuel and ignited for generating an annular stream of hot combustion gases, and a turbine section 180 for extracting energy from the combustion gases. Axis 110 defines an axial direction of the engine 100. In some embodiments, a low pressure spool is composed of a low pressure shaft and a low pressure turbine. The low pressure shaft drives the propeller 120. A high pressure spool is composed of a high pressure turbine attached to a high pressure shaft, which is connected to the compressor section 140. It should be noted that other configurations for the engine 100 are also considered.

Control of the operation of the engine 100 can be effected by one or more control systems, for example an engine controller 210. The engine controller 210 can modulate a fuel flow rate provided to the operating engine 100, the position and/or orientation of variable geometry mechanisms within the engine 100, a bleed level of the engine 100, and the like.

Figure 2:
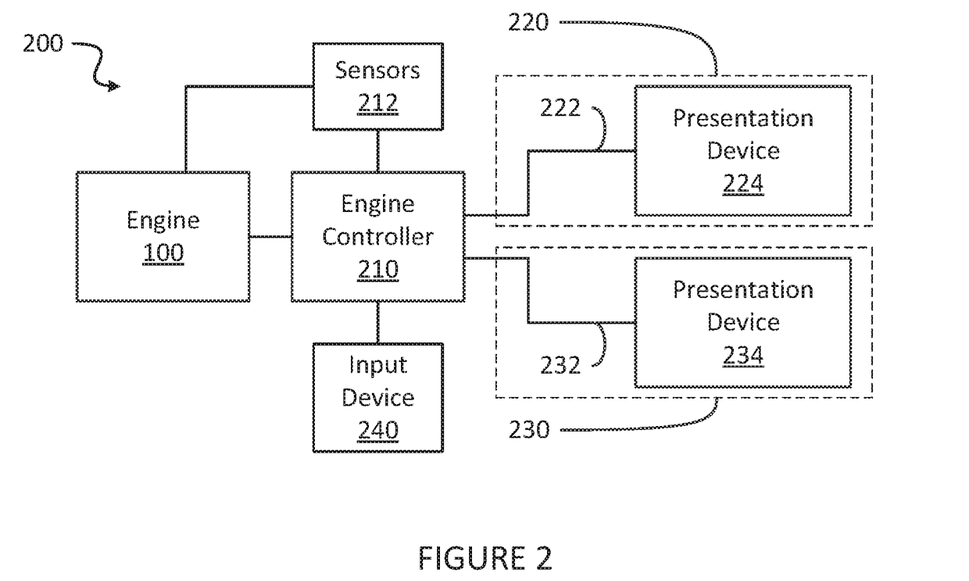
FIG. 2 is a block diagram of an example system for validating component integrity, in accordance with one or more illustrative embodiments.

With reference to FIG. 2, there is shown a system 200 for validating the integrity of components within an aircraft, for example within the engine 100 of an aircraft. The system 200 is composed of an engine controller 210, an input device 240, and presentation devices 224, 234, each of which is coupled to the engine controller 210 via a corresponding communication link 222, 232. Together, the presentation device 224 and the communication link 222 form a communication path 220 for providing an operator of the aircraft and/or the engine 100 with usage data pertaining to the aircraft and/or to the engine 100. Similarly, the presentation device 234 and the communication link 232 together form a communication path 230.

The communication paths 220, 230 are independent of one another: this means that both of the communication links 222, 232, and both of the presentation devices 224, 234 are independent of one another. In the context of the present disclosure, the communication links 222, 232 being independent from one another means that the ability of the communication link 222 to correctly perform tasks is not affected by the state of the communication link 232, and vice-versa. Put differently, a failure of the communication link 232 should not impact the ability of the communication link 222 to perform tasks, and vice-versa. The independence of the presentation devices 224, 234 is similarly implemented, so that failure of the presentation device 234 does not affect the ability of the presentation device 224 to operate, and vice-versa. In some embodiments, the input device 240 is also independent from the communication paths 220, 230, so that failure of any of the elements forming part of the communication paths 220, 230 does not affect the ability of the input device 240 to function, and vice-versa.

The engine controller 210 can be any suitable type of engine controller, including a full-authority digital engine controller (FADEC) or similar device. The engine controller 210 is configured for controlling operation of one or more engines of an aircraft. In the embodiment of FIG. 2, the engine controller 210 controls operation of the engine 100. The engine controller 210 is also configured for logging various information about aircraft usage and operating conditions. The engine controller 210 can monitor the operation of the engine 100 of the aircraft to determine time of operation, track the power level of the engine 100 over the period of operation, log the occurrence of unexpected events during the period of operation, and the like. In addition, the engine controller 210 can be provided with, or be coupled to, a variety of sensors 212 to allow the engine controller 210 to monitor operating conditions including temperature, pressure, humidity, and the like. In this fashion, the engine controller 210 is capable of evaluating the fatigue of components within the aircraft due to a period of operation, for instance to obtain usage data for components within the aircraft, for instance a count of fatigue cycles.

In some embodiments, the engine controller 210 can measure raw usage data for a particular component, then adjust the raw usage data based on the conditions in which the component was operated. For example, if the component was operated in relatively low temperatures, the raw usage data can be adjusted downward to compensate for the relatively low strain experienced by the component. In another example, if the component was operated in relatively high temperatures, the raw usage data can be reduced only slightly, or not at all. Other adjustments can be performed based on other operating conditions, as appropriate.

The input device 240 can be any suitable type of device through which an input relating to usage data can be provided to the engine controller 210, for example from an operator of the aircraft and/or of the engine 100. In some embodiments, the input device 240 can include a keyboard, a mouse, a touchscreen, or other similar input mechanisms. In other embodiments, the input device 240 can include a speaker or other audio recording equipment coupled to a voice processing device for analyzing audio obtained via the speaker to produce a value (numerical or otherwise) relating to usage data for the aircraft. Other embodiments for the input device 240 are considered. The input device 240 can be coupled to the engine controller 210 in any suitable fashion.

The presentation devices 224, 234 can be any suitable type of device for presenting information, for example to an operator of the aircraft. In some embodiments, the presentation devices 224, 234 are independent displays within a cockpit of the aircraft. In some other embodiments, the presentation devices 224, 234 are different windows on a common display, for example first and second windows associated with first and second programs, which are run independently. For instance, the first and second programs can be run as independent threads within a larger system-level program. Other implementations are also considered.

In further embodiments, the presentation devices 224, 234 are independent speakers or other audio systems within the cockpit of the aircraft. In some other embodiments, the presentation devices 224, 234 are independent programs configured for presenting information via a common speaker in the cockpit of the aircraft. In still further embodiments, the presentation devices 224, 234 can be any suitable combination of displays and speakers.

The communication links 222, 232 can be any suitable means for linking the engine controller 210 to the presentation devices 224, 234 which are independent of one another. In some embodiments, the communication links 222, 232 can be wired communication links, for example electrical or optical cables. For instance, the communication links 222, 232 can be two independent circuits which are part of a common device. In other embodiments, the communication links 222, 232 are wireless communication links, for example Bluetooth™, Zigbee™, or the like. Combinations of wired and wireless communication links are also considered. In some embodiments, the communication link 222 can be substantially similar to the communication link 232. In other embodiments, the communication links 222, 232 can be of different types, for example one wired, and one wireless. Other configurations are also considered.

In operation, the engine controller 210 provides the presentation device 224 with an indication of usage data for the engine 100, for a component thereof, or a component of an aircraft to which the engine 100 is coupled, associated with a period of operation of the engine 100. The presentation device 224 presents, to an operator of the aircraft and/or of the engine 100, an indication of the usage data as measured by the engine controller 210, as provided by the engine controller 210. The presentation device 224 can, for example, display a numerical value indicative of the usage data, or any other suitably-representative indication of the usage data.

The input device 240 enables an operator of the aircraft and/or of the engine 100 to provide the engine controller with a manually-entered value for the usage data of the aircraft over the period of operation. The engine controller 210 can then compare the value for the usage data as measured by the engine controller 210 with the manually-entered value as provided by the operator via the input device 240. Based on the result of the comparison, the engine controller 210 can issue an alert to the presentation device 234 for the operator. In some embodiments, the operator is expected to enter, via the input device 240, the same indication of the usage data as presented by the presentation device 224. This allows the engine controller 210 to assess whether the indication of the usage data provided to the presentation device 224 was correctly transmitted, ensuring the accuracy of the transmitted indication of the usage data. In other embodiments, the operator enters, via the input device 240, an indication of independently-acquired usage data.

In certain embodiments, the engine controller 210 is assigned a high trust level, for instance FDAL A or FDAL B, suitable for communicating information relating to top-level failure conditions of catastrophic, severe, and/or hazardous levels. As a result, the engine controller 210 is suitable for communicating usage data relating to the integrity of components of the engine and/or of the aircraft, such as fatigue cycle counts. The communication links 222, 232, the presentation devices 224, 234, and/or the input device 240, are assigned a lower trust level than the engine controller 210, for example FDAL B, FDAL C, or FDAL D. Under standard regulatory guidelines, information provided from the engine controller 210 to the presentation devices 224, 234 (via the communication links 222, 232), or from the input device 240 to the engine controller 210, is assigned the lowest trust level of any component in the path. Therefore, communication between the engine controller 210 and the presentation devices 224, 234 and/or the input device 240 is assigned a trust level lower than required for reporting usage data for a period of operation of the aircraft. Put differently, due to the lower trust level of the communication paths 220, 230, whether due to the communication links 222, 232 and/or due to the presentation devices 224, 234, and due to the lower trust level of the input device 240, usage data measured by the engine controller 210 or provided to the engine controller 210 from the input device 240 cannot be used in a regulation-compliant fashion.

However, by using two independent mechanisms for transmission of information to an operator of the aircraft and/or the engine 100, an overall communication system can be elevated by one trust level over the lowest trust level of the constituent components of the communication system. Thus, by providing two independent communication paths 220, 230, which transmit information from the engine controller 210 to two independent presentation devices 224, 234 via two independent communication links 222, 232, the higher trust level of the engine controller 210 can be maintained throughout the system 200. In this fashion, usage data can be transmitted from the engine controller 210 to an operator while maintaining an appropriate trust level, meeting regulatory requirements.

For example, regulations may require a trust level of FDAL A to properly report usage data. An example aircraft has an EECS of trust level FDAL A, a first cockpit screen having a trust level FDAL B and a second, independent cockpit screen having a trust level FDAL B. The EECS is coupled to the first and second cockpit screens via independent electrical wires, which are of trust level FDAL B. The input device 240 can be a cockpit computer having a trust level FDAL B. Although the cockpit screens, electrical wires, and cockpit computer are only of trust level FDAL B, because two independent pathways are used to report the information provided by the EECS, the trust level of the cockpit screens and electrical wires is elevated to FDAL A, thereby maintaining the trust level required for electronic reporting of usage data. Other regulations may require different trust levels for reporting usage data, and the trust levels of the communication links 222, 232, the presentation devices 224, 234, and the input device 240 can be varied as a function of regulatory requirements.

Although the foregoing discussion has focused on providing the usage data to an operator using displays and/or speakers within the cockpit of the aircraft, it should be noted that other approaches are considered. For example, an operator can be located outside the aircraft, for instance in proximity to the engine 100 of the aircraft, and can use one or more handheld devices to query the engine controller 210 to obtain the usage data. The handheld devices can be wiredly or wirelessly coupled to the engine controller 210, forming the communication links 222, 232. Still other approaches are also considered.

It should also be noted that, in the context of the comparison performed at the engine controller 210, the usage data for the aircraft and/or of the engine 100 is considered to be validated when the two values for the usage data sufficiently match, for example within a predetermined range or based on a predetermined threshold. If the usage data value provided by the operator via the input device 240 differs from the usage data measured by the engine controller 210, the engine controller may alert the operator to discard the measurements and instead use a value based on time of flight or a similar metric. In some embodiments, the manufacturer, regulator, or other authority can impose a maximum value for the discrepancy between the measured and manually-entered usage values.

Figure 3:
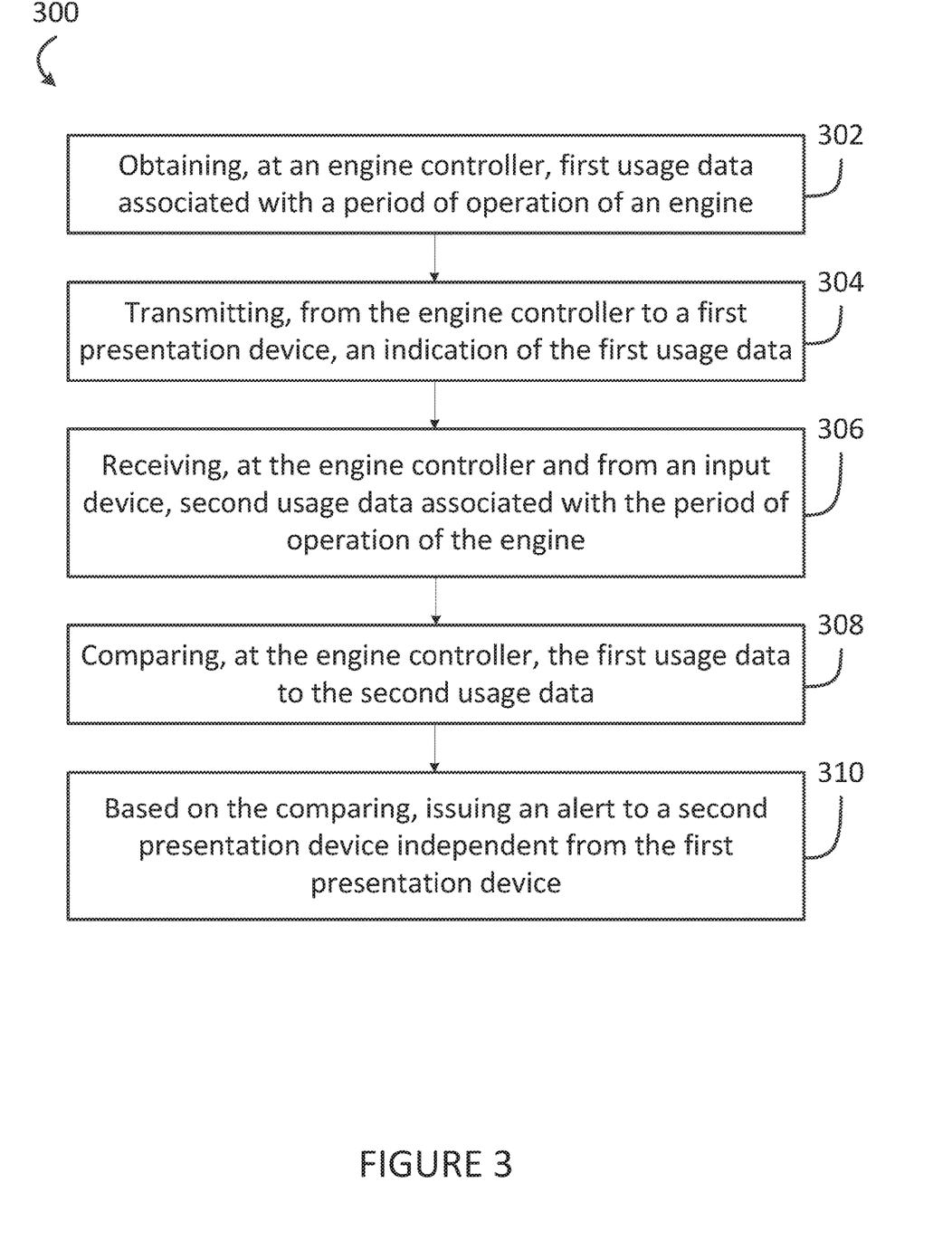
FIG. 3 is a flowchart of an example method for validating component integrity, in accordance with one or more illustrative embodiments.

With reference to FIG. 3, there is shown a method 300 for validating component integrity during operation of an engine, for instance the engine 100. At step 302, first usage data associated with a period of operation of the engine 100 is obtained at an engine controller, for instance the engine controller 210. In some embodiments, the engine controller 210 is configured for adjusting raw usage data based on the operating conditions to which the component was subjected. For instance, the raw usage data can be adjusted based on an operating temperature, pressure, speed, or similar characteristic. In some embodiments, the engine controller 210 collects information about the operating conditions of the engine 100 during a period of operation of the engine 100, and when the period of operation is terminated, compiles the first usage data based on the duration of the period of operation and the operating conditions, as appropriate. The first usage data can relate to a component of the engine 100, to a component outside the engine, for instance a component of an aircraft to which the engine is coupled, or to any other suitable component.

At step 304, an indication of the usage data is transmitted to a first presentation device, for instance the presentation device 224, which forms part of a first communication path, for instance the communication path 220. The first presentation device 224 is coupled to the engine controller 210 via a first communication link, for instance the communication link 222. The indication of the usage data can be any suitable representation of the usage data, using any suitable numbering scheme and any suitable units. For example, the indication can be an absolute number representing the number of fatigue cycles experienced by the component. In another example, the indication is a percent value indicating what proportion of the life cycle of the component was consumed during operation, or indicating what proportion of the life cycle of the component remains following operation. Other implementations are also considered.

At step 306, second usage data associated with the period of operation of the engine is received from an input device, for instance the input device 240. The second usage data can be input, for example, by an operator of the engine 100 and/or of an aircraft to which the engine 100 is coupled. The second usage data can be input in any suitable format and using any suitable representation. In some embodiments, the input device 240 specifies to the operator the format in which the second usage data should be provided.

In some embodiments, the operator is expected to provide exactly the same value as was presented to the operator by the presentation device 224. That is to say, after the presentation device 224 presents the indication of the first usage data to the operator, the input device 240 is configured to request that the operator provide an indication of the second usage data, which should be substantially identical to the indication of the first usage data. In other embodiments, the input device 240 queries the operator to provide an indication of the second usage data which is independently-obtained.

At step 308, the first and second usage data are compared at the engine controller 210. The comparison can be effected using any suitable algorithms and/or calculations. In some embodiments, an absolute difference between the first and second usage data can be evaluated, for instance by subtracting the first usage data from the second usage data. In some other embodiments, a relative difference between the first and second usage data can be evaluated, for instance by dividing the difference between the first and second usage data by the sum of the first and second usage data. Other approaches for comparing the first and second usage data are also considered.

For example, the engine controller 210 is configured for obtaining the usage data in the form of a floating point number (i.e., a "float"), and one of the elements in the communication path 220 is configured to employ only integers (i.e., an "int") when processing the usage data. As a result, the usage data provided by the engine controller 210 can be truncated, rounded, or otherwise modified, and the presentation device 224 can fail to reproduce the usage data with perfect precision. The communication path 220 can also alter the usage data in other ways, causing a loss of precision when the presentation device 224 presents the usage data. When the input device 240 provides the engine controller 210 with the manually-entered usage data, a discrepancy between the measured usage data and the manually-entered usage data can be expected.

At step 310, the engine controller 210 issues an alert to a second presentation device independent from the first presentation device 224, for example the presentation device 234, based on the comparing. In some embodiments, the engine controller 210 issues the alert to the second presentation device 224 when the comparison indicates that the first and second usage data are sufficiently different from one another. For example, the engine controller 210 issues the alert to the second presentation device 234 when the comparison of the first and second usage data indicates that the first and second usage data differ (i.e., the delta between the first and second usage data) by an amount greater than a predetermined threshold. The predetermined threshold can be an absolute value, a percentage, or the like. For instance, the predetermined threshold can establish a range centered at the value for the first usage data, and when the second usage data has a value outside the range, the second usage data is considered to be sufficiently different from the first usage data.

In some other embodiments, the engine controller 210 issues the alert to the second presentation device 224 when the comparison indicates that the first and second usage data are sufficiently similar to one another. For example, the engine controller 210 issues the alert to the second presentation device 234 when the comparison of the first and second usage data indicates that the first and second usage data match within the predetermined threshold, or within the range centered at the value for the first usage data. Other embodiments of circumstances in which the second usage data can be considered to be sufficiently similar to the first usage data are also considered. The predetermined threshold can be set by a manufacturer, regulator, or other authority which can impose a maximum value for the discrepancy between the measured and manually-entered usage values.

In some further embodiments, the engine controller 210 is configured for issuing a first alert when the first and second usage data are sufficiently similar, and for issuing a second, different alert when first and second usage data are sufficiently different. Still other approaches are considered. For instance, a different, third alert can be issued to the presentation device 234 to signal to the operator that the second usage data should be re-input through the input device 240, in the case of a discrepancy between the first and second input data.

The alert issued to the second presentation device 234 can be an audible alert, such as a chime, ring, buzzer, or other suitable sound, and different sounds can be associated with different results of the comparison at step 308. Alternatively, or in addition, the alert issued to the second presentation device 234 can be a visible alert, such as a coloured light, a particular flashing pattern, a dialog box on a screen of a cockpit computer, or any other suitable visual marker, and different visual markers can be associated with different results of the comparison at step 308. Other approaches are also considered. For instance, the engine controller 210 can cause the presentation device 234 to produce an audible alert if the difference is less than the predetermined threshold, and a visible alert if the difference is greater than the threshold, for instance to specify how large the difference is, or to instruct the operator on how to proceed with ascertaining correct usage data.

In some embodiments, if the difference between the first and second usage data exceeds the predetermined threshold, the input device 240 can solicit the operator to repeat entry of the second usage data, thereby repeating step 306. For instance, if the operator makes a mistake when entering the second usage data via the input device 240, the input device 240 may allow the operator to resubmit the second usage data to the engine controller 210, then repeat steps 308 and 310. In some cases, the engine controller 210 may set a maximum number of resubmission attempts, after which point the engine controller 210 provides an alert to the presentation device 234 indicating that no further submissions of the second usage data will be permitted.

Figure 4:
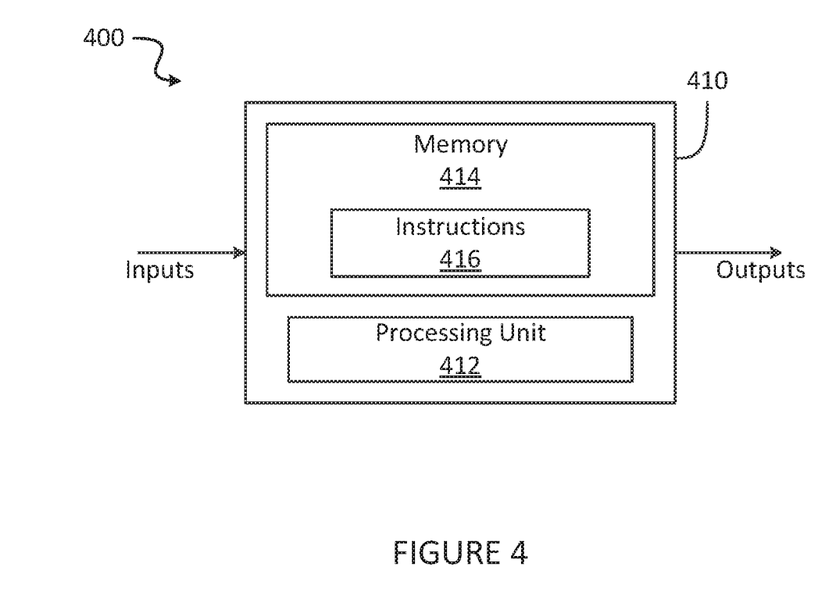
FIG. 4 is block diagram of an example computing device for implementing the method of FIG. 3, in accordance with one or more illustrative embodiments.

With reference to FIG. 4, the method of FIG. 3 may be implemented by a computing device 410 as an embodiment of the engine controller 210. The computing device 410 comprises a processing unit 412 and a memory 414 which has stored therein computer-executable instructions 416. The processing unit 412 may comprise any suitable devices configured to implement the functionality of the engine controller 210 such that instructions 416, when executed by the computing device 410 or other programmable apparatus, may cause the functions/acts/steps performed by the engine controller 210 as described herein to be executed. The processing unit 412 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, custom-designed analog and/or digital circuits, or any combination thereof.

The memory 414 may comprise any suitable known or other machine-readable storage medium. The memory 414 may comprise non-transitory computer readable storage medium, for example, but not limited to, an electronic, magnetic, optical, electromagnetic, infrared, or semiconductor system, apparatus, or device, or any suitable combination of the foregoing. The memory 414 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 414 may comprise any storage means (e.g., devices) suitable for retrievably storing machine-readable instructions 416 executable by processing unit 412.

It should be noted that the computing device 410 may be implemented as part of a FADEC or other similar device, including electronic engine control (EEC), engine control unit (EUC), engine electronic control system (EECS), and the like. In some embodiments, engine controller 210 is implemented as a dual-channel FADEC. In some other embodiments, the engine controller 210 can be two separate EECS, each configured to transmit a respective one of the indications to a respective one of the presentation devices 224, 234, via a respective one of the communication links 222, 232. In addition, it should be noted that the techniques described herein can be performed by the engine controller 210 substantially in real-time.

The above description is meant to be exemplary only, and one skilled in the art will recognize that changes may be made to the embodiments described without departing from the scope of the present disclosure. Still other modifications which fall within the scope of the present disclosure will be apparent to those skilled in the art, in light of a review of this disclosure.

Various aspects of the systems and methods described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A method for validating component integrity in an engine of an aircraft, comprising:
   obtaining, at an engine controller configured for controlling operation of the engine, a measured value indicative of usage experienced by the engine during a period of operation of the engine;
   transmitting, from the engine controller to a first presentation device presenting information to an operator of the aircraft, an indication of the measured value;
   causing the first presentation device to present to the operator of the aircraft a presented value indicative of the usage experienced by the engine during the period of operation of the engine;
   requesting that the operator of the aircraft inputs an operator-input value indicative of the usage experienced by the engine during the period of operation of the engine identical to the presented value via an input device;
   receiving, at the engine controller from the operator of the aircraft via the input device, the operator-input value indicative of usage experienced by the engine during the period of operation of the engine;
   comparing, at the engine controller, the operator-input value to the measured value; and
   based on the comparing, issuing an alert to a second presentation device independent from the first presentation device.

2. The method of claim 1, wherein issuing the alert to the second presentation device based on the comparing comprises issuing the alert when the operator-input value and the measured value differ by an amount greater than a threshold.

3. The method of claim 1, wherein issuing the alert to the second presentation device based on the comparing comprises issuing the alert when the operator-input value and the measured value match within a threshold.

4. The method of claim 1, wherein issuing the alert to the second presentation device based on the comparing comprises:
   issuing a first alert when the operator-input value and the measured value differ by an amount greater than a threshold; and
   issuing a second alert, different from the first alert, when the operator-input value and the measured value match within a threshold.

5. The method of claim 1, wherein comparing the operator-input value to the measured value comprises:
   determining a difference between the operator-input value and the measured value; and
   comparing the difference to a predetermined threshold value.

6. The method of claim 1, wherein transmitting the indication to the first presentation device comprises transmitting the indication via a communication path comprising at least one element which is of a lower trust level than the engine controller.

7. The method of claim 1, wherein transmitting the indication to a first presentation device comprises transmitting the indication to one of a screen in a cockpit of the aircraft, a speaker in the cockpit of the aircraft, and a handheld device.

8. The method of claim 1, wherein issuing an alert to the second presentation device comprises producing an audible alert.

9. The method of claim 1, wherein the usage data comprises a count of fatigue cycles for a component of the engine.

10. The method of claim 1, wherein the usage data comprises a count of fatigue cycles for a component of the aircraft to which the engine is coupled.

11. A system for validating component integrity in an engine of an aircraft, comprising:
a processing unit; and
a non-transitory computer-readable medium coupled to the processing unit and having stored thereon instructions executable by the processing unit for:
obtaining, at an engine controller configured for controlling operation of the engine, a measured value indicative of usage experienced by the engine during a period of operation of the engine;
transmitting, from the engine controller to a first presentation device presenting information to an operator of the aircraft, an indication of the measured value;
causing the first presentation device to present to the operator of the aircraft a presented value indicative of the usage experienced by the engine during the period of operation of the engine;
requesting that the operator of the aircraft inputs an operator-input value indicative of the usage experienced by the engine during the period of operation of the engine identical to the presented value via an input device;
receiving, at the engine controller, the operator-input value indicative of usage experienced by the engine during the period of operation of the engine, the operator-input value received from the operator of the aircraft via the input device;
comparing, at the engine controller, the operator-input value to the measured value; and
based on the comparing, issuing an alert to a second presentation device independent from the first presentation device.

12. The system of claim 11, wherein issuing the alert to the second presentation device based on the comparing comprises issuing the alert when the operator-input value and the measured value differ by an amount greater than a threshold.

13. The system of claim 11, wherein issuing the alert to the second presentation device based on the comparing comprises issuing the alert when the operator-input value and the measured value match within a threshold.

14. The system of claim 11, wherein issuing the alert to the second presentation device based on the comparing comprises:
issuing a first alert when the operator-input value and the measured value differ by an amount greater than a threshold; and
issuing a second alert, different from the first alert, when the operator-input value and the measured value match within a threshold.

15. The system of claim 11, wherein comparing the operator-input value to the measured value comprises:
determining a difference between operator-input value and the measured value; and
comparing the difference to a predetermined threshold value.

16. The system of claim 11, wherein transmitting the indication to the first presentation device comprises transmitting the indication via a communication path comprising at least one element which is of a lower trust level than the engine controller.

17. The system of claim 11, wherein transmitting the indication to a presentation device comprises transmitting the indication to one of a screen in a cockpit of the aircraft, a speaker in the cockpit of the aircraft, and a handheld device.

18. The system of claim 11, wherein issuing an alert to the second presentation device comprises producing an audible alert.

19. The system of claim 11, wherein the usage data comprises a count of fatigue cycles for a component of the engine.

20. The system of claim 11, wherein the usage data comprises a count of fatigue cycles for a component of the aircraft to which the engine is coupled.

* * * * *